Feb. 19, 1924.
W. P. HAMMOND
REAR VIEW MIRROR
Filed July 31, 1922
1,484,021
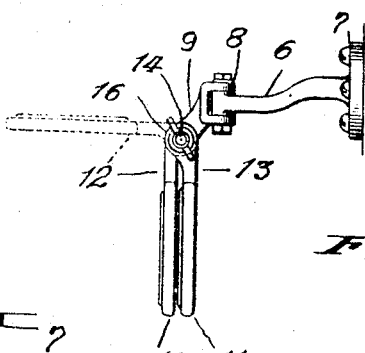
Fig. 3.   Fig. 4.
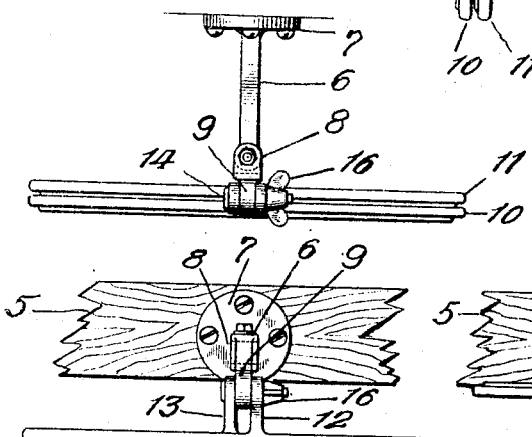
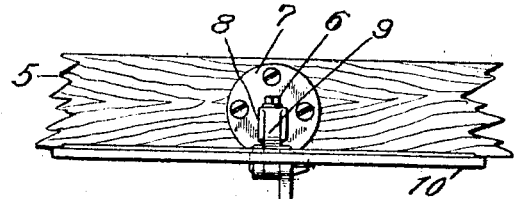
Fig. 1.   Fig. 2.
INVENTOR
WILLIAM P. HAMMOND
BY
ATTORNEYS Patented Feb. 19, 1924.

1,484,021

UNITED STATES PATENT OFFICE.

WILLIAM P. HAMMOND, OF MAPLEWOOD, NEW JERSEY.

REAR-VIEW MIRROR.

Application filed July 31, 1922. Serial No. 578,616.

*To all whom it may concern:*

Be it known that I, WILLIAM P. HAMMOND, a citizen of the United States, residing in Maplewood, in the county of Orange and State of New Jersey, have invented certain new and useful Improvements in Rear-View Mirrors, of which the following is a specification.

This invention relates to improvements in mirrors and more especially to those mirrors which are used for the purpose of obtaining a view of objects in the rear of vehicle drivers.

The invention has for its object an improved combination of mirrors which will provide a clear reflecting surface for ordinary use and a reflecting surface which will modify the reflected light rays when desired, the clear reflecting surface and the modifying surface being so arranged that one may be easily and quickly substituted for the other when the intensity of the reflected light changes, thus preventing light beams of great brilliancy, such as those from the headlamps of a following vehicle or from the direct rays of the sun, from blinding or dazzling the eyes of the vehicle driver.

An objection to the prior use of rear view mirrors attached to vehicles has been that at times the light beams reflected were of such intensity as to produce temporary blindness if caught full on the retina of the unprotected eye. The danger produced by such temporary blindness when operating a vehicle at considerable speed was very great, not alone to the driver and his passengers but to others near by, in vehicles or on foot.

The present invention provides for readily available protection against such reflected rays, while still affording a view of the rear. It does this at a minimum of expense by means of a simple mechanism without complicated parts. The attached drawings and the specification of which they form a part, serve to disclose one embodiment of my invention. Like numerals refer to like parts throughout the several figures.

Figure 1 is an elevation of an embodiment of my invention.

Figure 2 is an elevation of the embodiment shown in Figure 1 with part of the device in a changed position.

Figure 3 is a top view of the device.

Figure 4 is an end elevation of the device.

The embodiment which has been chosen to illustrate my invention is particularly adapted to vehicles having a top, or closed body, and in Figure 1 a portion 5 of this top serves as a convenient part of the vehicle on which to mount the mirror supporting arm 6, by means of a suitable flange portion 7. The outer end of this arm 6 is provided with a vertical hinge 8 which has an extending member 9. The two mirrors 10 and 11 are provided at their upper edges with the flattened members 12 and 13, which bear against opposite sides of the member 9. A single bolt 14 passes through the members 13, 9 and 12 and serves as a hinge bolt. The friction of the members one against the other may be adjusted by the wing nut 16, and these members may be clamped to hold the mirrors 10 and 11 attached to the members 12 and 13, in any planes of vertical angularity to the arm 6. The hinge 8 provides for any desired movement of the mirrors in a horizontal plane. Thus by means of these two hinges, the mirrors may be adjusted to reflect light rays coming from any desired direction.

The mirrors 10 and 11 may also be adjusted to positions at an angle to each other in a vertical plane. That is, these mirrors may rest one behind the other as in Figures 1, 3 and the solid lines in Figure 4. When in this position the clear mirror 10 is in a reflecting position and the light rays are reflected at full brilliancy. If the reflected brilliancy proves too great, the clear mirror 10 is swung up to the non-reflecting position shown in Figure 2, and by dotted lines in Figure 4. This exposes in a reflecting position the modifying mirror 11 and the light rays will be reflected when coming from the same direction as before, but at a diminished brilliancy. This light modifying mirror 11 may have a colored or smoked glass to produce a ray-modifying effect or such effect may be obtained by any other suitable method known to the optical art.

The fact that the mirrors may be flat one upon the other when the clear mirror is exposed, enables the driver of the vehicle to adjust both mirrors to reflect rays from a given direction by simply adjusting the clear mirror to reflect the desired rays, then when the modifying mirror is required no delay to effect an adjustment is necessary, the modifying mirror may be used immediately.

If desired, both mirrors may be swung to a non-reflecting position, and will lie flat together as before and in such compact space that they will form no obstruction to the view or motions of the driver of the vehicle.

In the embodiment shown in the accompanying drawings the mirrors used are rectangular in form, with long horizontal axis and short vertical axis. This is a form which may be advantageous for one type of vehicle top. It will be understood, however, that the shape of the mirrors is not an essential factor of my invention.

It is, of course, understood that I do not limit my invention to the specific embodiments shown, for it will be evident that as a modification the mirror 11 might be the clear mirror, and the mirror 10 the one of modifying function. Or as a further modification, the mirror 11 might be the clear mirror, while the mirror 10 is replaced by a modifying screen of colored, or semi-transparent material. And while the mirrors are shown as mounted on hinges, many other forms of mounting 8 would be equally suitable, and it will be understood that all of the foregoing changes and many others might be made without departing from the spirit of my invention or the scope of the following claims.

What I claim is:

1. The combination with a rear view mirror support for automobiles, of means carried by said support for reflecting rays of light, and means of a different reflecting power pivoted to the support and movable into and out of position in front of the reflection portion of the first named means.

2. In combination, with a rear view mirror, means to support the mirror in operative position, and means associated with the mirror and movable into and out of operative position in front of the mirror to change the amount of light reflected.

3. In combination with a rear view mirror for reflecting the rays of light from the rear of the vehicle, means to support the mirror in operative position, and absorbing means, associated with the mirror and movable into and out of an operative position in front of the mirror to absorb part of said light rays.

4. The combination with a rear view mirror support for automobiles, of reflecting means carried by said support and movable into and out of position for reflecting full rays of light and means mounted so as to be normally obscured by said reflecting means for reflecting modified rays of light when the first named reflecting means is moved into non-reflecting position.

5. In a rear view mirror for vehicles, the combination of a clear mirror and a light modifying mirror mounted upon a common support in such manner that the clear mirror may be in reflecting position when the light modifying mirror is in non-reflecting position, said mirror mounting permitting said clear mirror to be moved to a non-reflecting position exposing the light modifying mirror in a reflecting position.

6. In a rear view mirror for vehicles comprising a clear mirror and a light modifying mirror of like outline, said mirrors swivelled and hinged at a common point to a common standard, relatively movable with respect to each other and mounted one in superposed relation to the other so that either mirror will render rear vision correctly when one mirror has been adjusted for such correct vision.

7. In a rear view mirror for motor vehicles, a clear mirror of substantially rectangular form and a light modifying mirror having the same outline, said mirrors arranged one behind the other, said clear mirror hinged to allow it to assume a reflecting position and a non-reflecting position, said non-reflecting position exposing the light modifying mirror in a reflecting position.

In testimony whereof I have affixed my signature to this specification.

WILLIAM P. HAMMOND.